(12) United States Patent
Brown et al.

(10) Patent No.: US 8,436,064 B2
(45) Date of Patent: May 7, 2013

(54) OPEN-CELL POLYURETHANE FOAM AND PROCESS FOR ITS MANUFACTURE

(75) Inventors: William L. Brown, Pleasantville, NY (US); Paul L. Matlock, Ossining, NY (US); Louis Muller, Divonne-les-Bains (FR); Fabrice Ponthet, Onex (CH)

(73) Assignee: Momentive Performance Materials Inc., Waterford, NY (US)

( * ) Notice: Subject to any disclaimer, the term of this patent is extended or adjusted under 35 U.S.C. 154(b) by 628 days.

(21) Appl. No.: 11/900,374

(22) Filed: Sep. 11, 2007

(65) Prior Publication Data

US 2009/0069457 A1    Mar. 12, 2009

(51) Int. Cl.
- *C08L 75/04* (2006.01)
- *C08J 9/00* (2006.01)
- *C08J 9/08* (2006.01)
- *C08G 18/00* (2006.01)

(52) U.S. Cl.
USPC ............... 521/137; 521/50; 521/51; 521/155; 528/31

(58) Field of Classification Search .................. 521/137, 521/50, 51, 155; 528/31
See application file for complete search history.

(56) References Cited

U.S. PATENT DOCUMENTS

| | | | |
|---|---|---|---|
| 2,834,748 A | 5/1958 | Bailey et al. | |
| 2,846,458 A | 8/1958 | Haluska | |
| 2,917,480 A | 12/1959 | Bailey et al. | |
| 3,194,773 A | 7/1965 | Hostettler | |
| 3,402,192 A | 9/1968 | Haluska | |
| 3,629,310 A | 12/1971 | Bailey et al. | |
| 3,637,541 A | 1/1972 | Rossmy | |
| 3,654,195 A | 4/1972 | Raleigh | |
| 3,793,237 A | 2/1974 | Watkinson | |
| 3,836,560 A | 9/1974 | Prokai et al. | |
| 3,957,843 A | 5/1976 | Bennett | |
| 3,980,688 A | 9/1976 | Litteral et al. | |
| 4,855,329 A | 8/1989 | Blevins, II et al. | |
| 5,112,874 A * | 5/1992 | Schlak et al. | 521/51 |
| 5,145,879 A | 9/1992 | Budnik et al. | |
| 5,192,812 A | 3/1993 | Farris et al. | |
| 6,187,891 B1 | 2/2001 | Rautschek et al. | |
| 6,239,186 B1 | 5/2001 | Mansfield et al. | |
| 6,528,557 B2 | 3/2003 | Lin | |
| 2007/0060661 A1 * | 3/2007 | Clark | 521/134 |

FOREIGN PATENT DOCUMENTS

| | | | |
|---|---|---|---|
| EP | 1 911 781 A | | 4/2008 |
| EP | 1911781 | * | 4/2008 |
| FR | 1 370 886 A | | 8/1964 |
| GB | 914 579 A | | 1/1963 |
| GB | 1006784 | * | 4/2008 |

* cited by examiner

*Primary Examiner* — Randy Gulakowski
*Assistant Examiner* — Kara Boyle
(74) *Attorney, Agent, or Firm* — Joseph E. Waters

(57) ABSTRACT

There is provided a predominantly open-cell polyurethane foam obtained from a predominantly open-cell polyurethane foam-forming reaction medium which comprises:
- a) at least one polyol;
- b) at least one polyisocyanate;
- c) at least one catalyst;
- d) water;
- e) a predominantly open-cell polyurethane foam-forming amount of at least one surfactant which is a balanced, substantially linear polyether-polysiloxane ABA' block copolymer; and,
- f) optionally, at least one additional component selected from the group consisting of other polymer and/or copolymer, chain extender, crosslinker, non-aqueous blowing agent, filler, reinforcement, pigment, tint, dye, colorant, flame retardant, antioxidant, antiozonant, UV stabilizer, anti-static agent, biocide and biostat.

28 Claims, No Drawings

OPEN-CELL POLYURETHANE FOAM AND PROCESS FOR ITS MANUFACTURE

BACKGROUND OF THE INVENTION

This invention relates to open-cell polyurethane foams and their manufacture.

The dimensional stability of a polyurethane foam can be an important consideration in a number of applications. In the case of predominantly open-cell polyurethane foams, the open cells enable the foam to readily breathe ensuring quick pressure and cell gas equilibration without the changes in cell size that may cause dimensional distortion in some closed-cell polyurethane foams. This dimensional distortion is particularly pronounced in closed-cell foams that are blown with water.

One current method of opening the cells of water-blown polyurethane foams is through the use of cell destabilizers, typically polydimethylsiloxanes (silicone oils). The problem with this approach is that cell wall opening tends to occur early in the foaming reaction thus destabilizing the foam. This can be overcome through the use of nonlinear silicone surfactants (polydimethylsiloxane backbones with pendant polyether chains) but the processing window that allows for the formation of a stable foam with open cell walls is often very narrow.

Another approach is to use linear block copolymers of polydimethylsiloxanes and polyethers [(polyether)(polydimethylsiloxane)]$_n$. These (AB)$_n$ copolymers, in which A represents the polyether block, B represents the polydimethylsiloxane block and n represents the number of repeating units, stabilize gas entrainment and reduce bubble coalescence during the foaming process until late in the reaction when they are able to open holes in the cell walls. Typically, the minimum useful number average molecular weight required for these (AB)$_n$ copolymers is greater than 30,000 and preferably from 65,000 to 100,000. Below this molecular weight, an (AB)$_n$ copolymer will likely fail to adequately stabilize a polyurethane foam. A problem with (AB)$_n$ copolymers that stabilize the foaming reaction and open the cell walls is that they tend to form hydrogels in the presence of water. This can limit their usefulness, especially when fully formulated resins containing both the (AB)$_n$ surfactant and water must remain stable for relatively extended periods of time prior to use. A second problem with (AB)$_n$ copolymers is that it can be difficult to control their molecular weight during manufacture.

SUMMARY OF THE INVENTION

In accordance with the present invention, there is provided a predominantly open-cell polyurethane foam obtained from a predominantly open-cell polyurethane foam-forming reaction medium which comprises:
  a) at least one polyol;
  b) at least one polyisocyanate;
  c) at least one catalyst;
  d) water;
  e) a predominantly open-cell polyurethane foam-forming amount of at least one surfactant which is a balanced, substantially linear polyether-polysiloxane ABA' block copolymer; and,
  f) optionally, at least one additional component selected from the group consisting of other polymer and/or copolymer, chain extender, crosslinker, non-aqueous blowing agent, filler, reinforcement, pigment, tint, dye, colorant, flame retardant, antioxidant, antiozonant, UV stabilizer, anti-static agent, biocide and biostat.

In contrast to the linear (AB)$_n$-type copolymers currently used in the manufacture of polyurethane foams, the balanced, substantially linear polyether-polysiloxane ABA' block copolymer (e) employed in the manufacture of the polyurethane foam of this invention is not only readily manufactured, it is significantly more resistant to hydrogel formation in the presence of water, an especially desirable property where the stability of the foam-forming resin is a significant concern.

Other than in the working examples or where otherwise indicated, all numbers expressing amounts of materials, reaction conditions, time durations, quantified properties of materials, and so forth, stated in the specification and claims are to be understood as being modified in all instances by the term "about."

It will also be understood that any numerical range recited herein is intended to include all sub-ranges within that range and any combination of the various endpoints of such ranges or subranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expressions "open-cell polyurethane foam" and "predominantly open-cell polyurethane foam" shall be understood herein to include rigid, flexible or semi-flexible polyurethane foams of all cell structure types, e.g., foams of predominantly microcellular, fine, medium, coarse or even very coarse cell structure. In the case of a flexible or semi-flexible microcellular foam, to qualify herein as an open-cell polyurethane foam, at least 70 percent of the cells must be open. In the case of a rigid foam, more than 50 percent of the cells must be open for the foam to be considered an open-cell polyurethane foam in accordance with the invention.

The term "alkyleneoxy" herein shall be understood to mean a divalent hydrocarbyl group of up to 18 carbon atoms possessing a terminal etheric oxygen atom, e.g., ethyleneoxy, propylenoxy, styreneoxy, tetramethyleneoxy, etc.

The term "balanced" as it applies to ABA' block copolymer surfactant (e) shall be understood herein to mean a set of characteristics structurally defining a particular ABA' block copolymer, specifically, (1) the ratio between the number average molecular weight value ($M_n$) of its polysiloxane B block and the $M_n$ values of its A and A' blocks, (2) the ethyleneoxy content of it's A and A' blocks and (3) the presence or absence of capped hydroxyl groups, whose cumulative influence is such that in the case of a particular open-cell polyurethane foam-forming reaction mixture and foam-forming reaction conditions, the ABA' block copolymer will support the formation of a stable, open-cell polyurethane foam. For a given open-cell polyurethane foam-forming reaction mixture and foam-forming reaction conditions, these structurally defining characteristics of an ABA' block copolymer surfactant that will result in a stable open-cell polyurethane foam can be empirically determined employing routine experimental testing such as that illustrated in the working examples herein.

The expression "stable foam" in the foregoing context is to be understood according to its art-recognized meaning as a polyurethane foam which, following the polyurethane-forming reaction, retains its substantially cellular character in contrast to a foam which collapses during the polyurethane-forming reaction.

The expression "open-cell polyurethane foam-forming amount" as it applies to balanced ABA' block copolymer surfactant (e) means an amount of this surfactant that in a particular open-cell polyurethane foam-forming reaction medium and under a particular set of polyurethane foam-forming reaction conditions will effect the stabilization of the foam as it forms thereby resulting in a predominantly open-cell polyurethane foam, and excludes those amounts of surfactant (e), either too small or too large, which fail to achieve such stabilization. What constitutes an "open-cell polyurethane foam-forming amount" of balanced ABA' surfactant (e) can be readily determined for a particular foam-forming reaction medium and foam-forming reaction conditions employing routine experimental testing, e.g., as illustrated in the working examples presented herein.

DETAILED DESCRIPTION OF THE INVENTION

The present invention contemplates the use of polyol(s) (a), polyisocyanate(s) (b), catalyst(s) (c) and optional component(s) (f) such as any of those heretofore known for use in the manufacture of polyurethane foams.

Among the suitable polyols (a) for preparing the polyurethane foam of the present invention are those having 2 to 8 hydroxyl groups per molecule and a number average molecular weight of from 200 to 10,000, preferably from 500 to 7,500. Included among the useful polyols are polyether diols and triols and polyols, polyester diols and triols and polyols, and hydroxyl-terminated polyolefin polyols such as the polybutadiene diols. Other useful polyols include sucrose and amine-started (initiated) polyols, polymer polyols (also graft polymer polyols, graft polyols or copolymer polyols, all of which are names used to describe dispersions of vinyl polymers in polyols produced by the in-situ polymerization of vinyl monomers (usually styrene and or acrylonitrile) in the base polyol), polyols derived from naturally occurring materials such as castor oil, chemically-modified soybean oil or other chemically-modified fatty acid oils and polyols resulting from the alkoxylation of such naturally occurring materials as castor oil and soybean oil.

Preferred polyols (a) are the polyether diols, triols, tetrols and polyols of even greater hydroxyl functionality heretofore employed in the manufacture of polyurethane foams. Polyether polyols are typically prepared by reacting a starter compound such as a polyhydroxyl compound, e.g., ethylene glycol, diethylene glycol, propylene glycol, glycerol, sucrose, etc., or polyamine such as ethylene diamine, and the like, with one or more alkylene oxides, phenyl-substituted alkylene oxides and/or cyclic ethers such as ethylene oxide, propylene oxide, styrene oxide, tetrahydrofuran, etc. The selected polyether polyol(s) advantageously have a number average molecular weight value ($M_n$) of from 200 to 10,000 and preferably from 250 to 8,000. Mixtures of different polyether polyols are contemplated. Examples of some useful polyether polyols include Voranol 220-028, Voranol 220-094, Voranol 225, Voranol 270, Voranol 490 and Voranol 800 (products of The Dow Chemical Company) and Arcol 11-34 (Bayer MaterialScience), and the like.

Suitable polyisocyanates (b) include, for example, methylenediphenylenediisocyanate (MDI) including 4-4' and 2-4' isomers and polymeric forms of MDI often referred to as polymeric MDI. Isocyanate prepolymers of MDI made from the reaction of MDI with polyols; modified versions such as uretonimine-modified MDI; and combinations in any proportions of MDI variants named above. Also suitable are toluenediisocyanate (TDI), including its 2,4 and 2,6 isomers and isocyanate prepolymers of TDI made from the reaction of TDI with polyols, and other aromatic or aliphatic polyisocyanates and modified versions thereof including uretonimine-modified polyisocyanates and their prepolymers. Blends of polyisocyanates are, of course, within the scope of the invention.

Catalyst(s) (c) include foam-forming organometallic catalysts such as nickelacetoacetonate, ironacetoacetonate, tin-based catalysts, bismuth-based catalysts and zinc-based catalysts. Other useful urethane catalysts (iii) include alkali metal carboxylates such as potassium octoate, potassium acetate, sodium acetate and sodium octoate, heavy metal-based catalysts such as those of mercury or lead, tertiary amine urethane catalysts such as triethylene diamine and bis(dimethylaminoethyl)ether, and quaternary ammonium salt catalysts such as quaternary ammonium carboxylate, e.g., DABCO® TMR catalyst from Air Products.

Balanced, substantially linear polyether-polysiloxane ABA' block copolymer (e) can be of the non-hydrolyzable or hydrolyzable type.

Non-hydrolyzable ABA' block copolymers can be prepared in any known manner, e.g., by the platinum-catalyzed addition reaction (hydrosilation reaction) of a substantially linear polysiloxane containing silanic hydrogen (i.e., a hydrosiloxane) at each of its two ends with a substantially linear polyether possessing a single olefinic group at or near one end of its chain and either a hydroxyl group or a capped hydroxyl group such as OR or OCOR where R is a hydrocarbyl group at the other end of the polyether chain.

Hydrolyzable ABA' block copolymers can be prepared in any known manner, e.g., by reacting a substantially linear polysiloxane possessing hydrolyzable functionality, e.g., hydrogen, amino, e.g., dimethlyamino, alkoxy, e.g., methoxy, ethoxy, etc., or halogen, bonded directed to each of its two terminal silicon atoms, with a substantially linear polyether possessing a hydroxyl group at only one end of its chain and a hydrocarbyl group, e.g., an alkyl, cycloalkyl, aryl, alkaryl, aralkyl, etc., group at the other end of the chain.

For both types of ABA' block copolymers, the polysiloxane reactant contributing the B block preferably possesses an $M_n$ value of from 350 to 3,200 and more preferably from 400 to 2,400, and the polyether reactant(s) contributing the A and A' blocks preferably possess $M_n$ values of from 200 to 3,000 and more preferably from 250 to 2,500.

In addition to the water component (d) which acts as a chemical blowing agent by reacting with polyisocyanate in the foam-forming reaction mixture to produce carbon dioxide gas, one or more supplemental blowing agents, either of the physical and/or chemical type, can be included in the reaction mixture. These supplemental blowing agents can include halogenated products such as HFC-245fa and HFC-134a and low boiling hydrocarbons such as iso-, cyclo- and n-pentane.

The monoolefinically unsaturated polyether may itself be obtained by reacting at least one monoolefinically unsaturated alcohol ("starter"), e.g., one of the general formula $HR^1C=CR^2CR^3R^4$—$(R^5)_p$—OH in which $R^1$, $R^2$, $R^3$ and $R^4$ each independently is hydrogen or a monovalent hydrocarbon group of up to 8 carbon atoms which is free of aliphatic carbon-to-carbon multiple bonds, $R^5$ is a divalent hydrocarbon group of up to 12 carbon atoms which is free of aliphatic carbon-to-carbon multiple bonds and p has a value of 0 or 1, with at least one alkylene oxide under ring-opening conditions that are well known in the art. If desired, the terminal hydroxyl group of the thus-obtained monoolefinically unsaturated polyether(s) can be end-capped with any of a variety of endblocking groups such as alkyl, aryl, ester, amide, etc.

Suitable monoolefinically unsaturated alcohols for preparing the polyether hydrosilation reactant include allyl alcohol, 2-methyl-2-propene-1-ol(2-methallyl alcohol), 2-buten-1-ol (crotyl alcohol)($CH_3CH=CHCH_2OH$), 1-buten-3-ol(1- methallyl alcohol), 3-buten-1-ol, 4-penten-1-ol, 2-pentene-1-ol, 3-penten-2-ol, 4-penten-2-ol, 2-methyl-1-buten-3-ol, 2-methyl-1-buten-4-ol, 3-methyl-2-buten-1-ol, 2-ethyl-1-propen-3-ol, 2-ethyl-1-penten-3-ol, 5-hexen-1-ol, 4-hexen-1-ol, 5-hexene-1-ol, 2-methyl-1-penten-3-ol, 2-methyl-4-penten-3-ol, 4-methyl-3-penten-1-ol, and the like. Preferred are the terminal monoolefinically unsaturated alcohols, in particular, allyl alcohol and methallyl alcohol.

The monoolefinically unsaturated polyether reactant can be prepared by reacting monoolefinically unsaturated starter such as any of those mentioned above, preferably allyl alcohol, with ethylene oxide or with mixtures of ethylene oxide containing a minor amount by weight, i.e., less than 50 weight percent, and preferably less than 30 weight percent, of one or more other epoxides and/or other strained oxygen-containing ring compounds, e.g., 2-epoxides such as ethylene oxide, propylene oxide, cis- and/or trans-butylene oxides, cis- and/or trans-pentene-2-oxides, cis- and/or trans-hexene-2-oxides, cis- and/or trans-hexene-3-oxides; 1,3-epoxides such as triemethylene oxide; and, 1,4-epoxides such as tetrahydrofuran ("THF"), and the like, e.g., as described in U.S. Pat. No. 4,722,978, the entire contents of which are incorporated by reference herein.

Typical conditions for the hydrosilation reaction of monoolefinically unsaturated polyether and hydrosiloxane to produce the substantially linear polyether-polysiloxane balanced ABA' block copolymer surfactant (e) herein include elevated temperature, subatmospheric to superatmospheric pressure, the presence of a catalyst, e.g., a platinum-containing catalyst, the optional use of solvent and an olefinic group to ≡SiH ratio of, e.g., from 1.0 to 1.5. For particular details regarding hydrosilation, reference may be made to, inter alia, U.S. Pat. Nos. 2,846,458, 2,970,150, 3,957,483 and 5,274,156, the entire contents of which are incorporated by reference herein.

The substantially linear polyether monol reactant used in the production of hydrolyzable ABA' block copolymer surfactant (e) can be readily prepared in a known manner, e.g., by reacting a starter compound possessing a single hydroxyl group such as methanol, ethanol, n-propanol, isopropanol, n-butaine, sec-butanol, tert-butanol, phenol, benzyl alcohol, etc., with ethylene oxide or mixtures of ethylene oxide containing a minor amount by weight, i.e., less than 50 weight percent, and preferably less than 30 weight percent, of one or other epoxides and/or other strained oxygen-containing ring compounds such as any of those previously mentioned.

The hydrolyzable ABA' block copolymers are readily prepared by reacting one or more of the foregoing substantially linear polyether monols with substantially linear polysiloxane possessing hydrolyzable end groups bonded to silicon, e.g., ≡SiZ wherein Z is a hydrolyzable group, e.g., an alkloxy group such as methoxy (—OMe) or ethoxy (—OEt), in a suitable mole ratio, e.g., an OH to ≡SiZ ratio of from 1.0 to 1.5, in the presence of an acidic or alkaline catalyst and in a solvent such as toluene with the continuous removal of by-product ZH, e.g., as disclosed in U.S. Pat. Nos. 2,917,480 and 3,801,616, the entire contents of which are incorporated by reference herein.

The balanced, substantially linear polyether-siloxane ABA' block copolymer(s) (e) employed as surfactant(s) in the polyurethane foam-forming reaction medium of this invention are to be distinguished from the $(AB)_n$-type copolymer surfactants referred to above and the comb-type (rake-type) copolymer surfactants possessing pendant polyether units along their polysiloxane backbones.

Experimental work has demonstrated that the ABA' block copolymer must exhibit the property of "balance" as defined above. Although the intrinsic requirements for a balanced ABA' copolymer surfactant are not known with certainty at this time such that they could be applied a priori to the synthesis of such a surfactant for a particular open-cell polyurethane foam-forming reaction medium and polyurethane foam-forming reaction conditions, such synthesis can be arrived at empirically by employing routine experimental testing as demonstrated by the working examples herein.

In one embodiment, balanced, substantially linear polyether-polysiloxane ABA' block copolymer surfactant (e) is represented by the general formula:

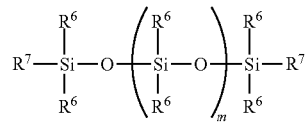

wherein:
each $R^6$ independently is alkyl or aryl of up to 18 carbon atoms; and,
each $R^7$ independently is a polyether moiety of either random or blocked structure —$CHR^1CHR^2CR^3R^4$—$(R^5)_p$O—$(C_2H_4O)_x(C_yR^8{}_{2y}O)_zQ^1$ or —O—$(C_2H_4O)_x(C_yR^8{}_{2y}O)_zQ^2$ in which $R^1$, $R^2$, $R^3$, $R^4$, $R^5$ and p are as previously defined, each $R^8$ independently is hydrogen, alkyl of up to 18 carbon atoms, phenyl or alkyl-substituted phenyl in which the alkyl substituent(s) independently contain up to 4 carbon atoms, $Q^1$ is hydrogen, alkyl of up to 18 carbon atoms, aryl or alkyl-substituted aryl of up to 10 carbon atoms, $CO_2R^9$ in which $R^9$ is alkyl of up to 4 carbon atoms, $CONHR^{10}$ in which $R^{10}$ is alkyl of up to 8 carbon atoms or phenyl or alkyl-substituted phenyl in which the alkyl substituent(s) independently contain up to 4 carbon atoms, $COR^{11}$ in which $R^{11}$ is alkyl of up to 18 carbon atoms or phenyl or alkyl-substituted phenyl in which the alkyl substituent(s) independently contain up to 4 carbon atoms, x is from 5 to 50, y is from 2 to 6, z is from 0 to 25, x+z is from 5 to 50, x/(x+z) is at least 0.57 and $Q_2$ has one of the same meanings as $Q^1$ other than hydrogen; and,
m is from 3 to 40.

In the foregoing general formula:
each $R^6$ independently is preferably alkyl of up to 3 carbon atoms and more preferably is methyl; and,
independently in each polyether moiety $R^7$,
$R^1$ is preferably hydrogen;
$R^2$ is preferably hydrogen or alkyl of up to 3 carbon atoms and more preferably is hydrogen or methyl;
$R^3$ is preferably hydrogen or alkyl of up to 3 carbon atoms and is more preferably hydrogen;
$R^4$ is preferably hydrogen or alkyl of up to 3 carbon atoms and more preferably is hydrogen;
each $R^8$ independently is preferably hydrogen or alkyl of up to 3 carbon atoms and more preferably is hydrogen or methyl;
$Q^1$ is preferably hydrogen or alkyl of up to 4 carbon atoms, more preferably hydrogen or methyl, or $COR^{11}$ in which $R^{11}$ is alkyl of up to 4 carbon atoms, more preferably methyl;
$Q^2$ is preferably alkyl of up to 8 carbon atoms, preferably methyl, ethyl, propyl, isopropyl, n-butyl, sec-butyl or tert-butyl;
p is preferably 0;
x is preferably from 6 to 40 and more preferably is from 6 to 30;
y is preferably from 2 to 4 and more preferably is 2;
z is preferably from 0 to 20 and more preferably is from 0 to 15;

x+z is preferably from 6 to 40 and more preferably is from 6 to 35;

x/(x+z) is preferably greater than 0.7; and, m is preferably from 3 to 30 and more preferably is from 4 to 30.

In another embodiment, balanced, substantially linear polyether-polysiloxane ABA' block copolymer surfactant (e) can be chosen from among the copolymers of this type, including those possessing an optional spacer group between the A and B blocks and/or the B and A' blocks, described in U.S. Pat. No. 6,528,557, the entire contents of which are incorporated by reference herein.

Based on 100 pphp (parts per hundred parts) of polyol(s) (a), the amounts of polyisocyanate(s) (b), catalyst(s) (c), water (d) and balanced, substantially linear polyether-polysiloxane ABA' block copolymer surfactant(s) (e) employed in the polyurethane foam-forming reaction medium herein can vary over fairly wide limits, e.g., as set forth in the following table:

| Components of the Polyurethane Foam-forming Reaction Medium Based on 100 pphp of Polyol(s) (a) | Broad Range, pphp | Preferred Range, pphp |
| --- | --- | --- |
| Polyisocyanate(s) (b) | 30-400 | 40-350 |
| Catalyst(s) (c) | 0.01-5 | 0.02-2 |
| Water (d) | 0.01-10 | 0-8 |
| ABA' block copolymer(s) (e) | 0.1-10 | 0.3-5 |
| Optional Component(s) (f) | Known and conventional amounts | |

Optional components(s) (f) include any of those known in the art, e.g., other polymer and/or copolymer, chain extender, crosslinker, non-aqueous blowing agent, filler, reinforcement, pigment, tint, dye, colorant, flame retardant, antioxidant, antiozonant, UV stabilizer, anti-static agent, biocide, biostat, and the like, in their usual amounts.

Thus, e.g., optional component(s) (f) can include polyhydroxyl-terminated materials such as those having 2 to 8 hydroxyl groups per molecule and a molecular weight from 62 to 500 that function as crosslinkers or chain extenders. Crosslinkers having 3 to 8 hydroxyl groups include glycerine, trimethoylpropane, pentaerythritol, mannitol, and the like. Examples of useful chain extenders having two hydroxyl groups include dipropylene glycol, diethylene glycol, 1,4-butanediol, ethylene glycol, 2,3-butanediol and neopentylglycol.

Optional component(s) (f) also may include fillers, e.g., inorganic fillers or combinations of fillers. Fillers may include those for density modification, physical property improvements such as mechanical properties or sound absorption, fire retardancy or other benefits including those that may involve improved economics such as, for example, calcium carbonate or other fillers that reduce the cost of manufactured foam, aluminum trihydrate or other fire retardant fillers, barium sulfate or other high-density filler that is used for sound absorption, microspheres of materials such as glass or polymers that may also further reduce foam density. Fillers of high aspect ratio that are used to modify mechanical properties such as foam stiffness or flexural modulus that would include: man-made fibers such as milled glass fiber or graphite fiber; natural mineral fibers such as wollastonite; natural animal such as wool or plant fibers such as cotton; man-made plate-like fillers such as shattered glass; natural mineral plate-like fillers such as mica; possible addition of any pigments, tints or colorants. Additionally, the invention contemplates the use of organic flame retardants; antiozonants, antioxidants; thermal or thermal-oxidative degradation inhibitors, UV stabilizers, UV absorbers or any other additive (s) that when added to the foam-forming composition will prevent or inhibit thermal, light, and/or chemical degradation of the resulting foam. Also contemplated for use herein are any of the known and conventional biostatic agents, antimicrobial agents and gas-fade inhibiting agents.

EXAMPLES

In accordance with generally accepted usage, the following symbols are used to describe the polyether-polysiloxane copolymer surfactants used in making the polyurethane foams (both within and outside the scope of the claims, the latter for comparison purposes) of the examples:

M refers to $(CH_3)_3SiO_{1/2}$;

M' refers to $(H)(CH_3)_2SiO_{1/2}$ (terminal hydrogen);

M" refers to $(X)(CH_3)_2SiO_{1/2}$ in which X is, e.g., methoxy, ethoxy, dimethylamino, hydrogen, halogen or other leaving group (X will undergo reaction with the hydroxyl group of a polyether monol to form a polysiloxane-polyether copolymer possessing a hydrolyzable

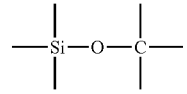

bond while releasing HX);

D refers to $(CH_3)_2SiO_{2/2}$;

D' refers to $(H)(CH_3)SiO_{2/2}$ (pendant hydrogen providing comb-type silicone-polyether copolymer upon reaction with olefinically unsaturated polyether); and, D" refers to $(R)(CH_3)SiO_{2/2}$ where R is a polyether-containing group.

The polyethers used in making the surfactants employed in the examples are also described in accordance with recognized usage as follows:

"H" indicates that the polyether is hydrophilic;

"A" indicates the use of allyl alcohol as the starter for making the polyether and the absence of "A" indicates the use of a non-olefinic diol starter such as ethylene glycol, diethylene glycol, dipropylene glycol, and the like. Comparative Examples 2 and 3 are $AB_n$ copolymers where the silicone-derived units are bonded to the polyether-derived units via

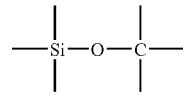

bonds.

The number preceding "H" is the approximate weight percent of polymerized or copolymerized ethylene oxide in the polyether, any balance being derived from the other oxirane(s) used in the making the polyether, in this case, propylene oxide; and, The number following "H" or "HA" is the approximate number average molecular weight of the polyether chain. The polyethers in these examples were random in nature; however, blocked polyethers are also useful.

It will be appreciated that in the examples which follow, only the balanced ABA' block copolymers obtained from those silicones possessing two M' groups and no D' or D' groups and polyethers containing a single allyl group (as indicated by the designation "HA") are illustrative of the invention.

Examples 1-17; Comparative Examples 1-31

The cell-opening characteristics of various polysiloxane-polyether copolymers were evaluated in rigid foams using the polyurethane foam-forming reaction medium set forth in Table 1 below. The pre-blended polyol (mixture of polyols, water, catalyst and surfactant) and the polyisocyanate were brought to room temperature (approximately 23° C.). The pre-blended polyol was stirred at 3500 rpm with a 2 inch double disc Conn blade for 5 seconds to aid nucleation. The polyisocyanate was then added to the pre-blended polyol with mixing at 3500 rpm using the same blade for 5 seconds. The uniformly blended polyurethane foam-forming reaction medium was then poured into a 12×3×12 inch mold held at 50° C. The resulting foam was removed from the mold after a 5 minute cure. After 24 hours, each foam product was cut into test sections and analyzed for k-factor (insulation), closed-cell content, density, cell structure and compressive strength. The results of these evaluations are presented in Tables 2-7.

TABLE 1

Rigid Polyurethane Foam-forming Formulation

| Component | Description | pphp | Wt. % |
|---|---|---|---|
| Voranol ® 490 | polyether (sucrose) polyol, 490 hydroxyl number | 10 | 8.74 |
| Voranol ® 800 | polyether (amine started) polyol, 800 hydroxyl number | 90 | 78.65 |

TABLE 1-continued

Rigid Polyurethane Foam-forming Formulation

| Component | Description | pphp | Wt. % |
|---|---|---|---|
| Water | Blowing agent | 8 | 6.99 |
| Niax ® Catalyst C-8 | tertiary amine catalyst | 1.43 | 1.25 |
| Surfactant | See Tables 2-7, infra | 5 | 4.37 |
| Total | | 114.43 | 100.00 |
| Isocyanate | polymeric MDI (MW = 340, NCO content = 31.4% by wt, functionality = 2.7) | 317 g Iso/ 100 g Resin | |
| Index | | 120 | |

Voranol is a registered trademark of the Dow Chemical Company;
Niax is a registered trademark of Momentive Performance Materials.

In Table 2 below, the polyurethane foams of Comparative Examples 1 and 2 were prepared with an out-of-balance ABA' copolymer resulting in predominantly closed-cell foams. The polyurethane foam of Comparative Example 3 was prepared with a conventional polysiloxane-polyether comb-type copolymer and also resulted in a predominantly closed-cell foam. The polyurethane foams of Comparative Examples 4 and 6 were prepared with a conventional copolymer of the $(AB)_n$-type and as expected, provided predominantly open-cell polyurethane foams. The polyurethane foam of Comparative Example 5 was prepared with the balanced ABA' block copolymer of Example 2 but at such a high level for this particular foam-forming formulation as to fail to provide an acceptable foam. The polyurethane foams of Examples 1-3 were made with balanced polyether-polysiloxane ABA' block copolymers in accordance with the invention and incorporated in the foam-forming medium of Table 1 at levels which provided predominantly open-cell polyurethane foams.

TABLE 2

Properties of Rigid Polyurethane Foams Made with Various Polyether-polysiloxane Copolymers

| Example | Silicone Reactant | Polyether Reactant | pphp Surf | *Cell Structure | Average K-factor | Percent Closed-cell | K-Factor Pad Density (g/cc) | Ave Perp. Comp Strength | Resin Stability | Gel |
|---|---|---|---|---|---|---|---|---|---|---|
| Ex. 1 | M'D10M' | 100HA350 | 2 | 1.5 | 0.2346 | 24 | 0.0299 | 9.6 | heavy haze | None |
| Ex. 2 | M'D15M' | 100HA350 | 2 | 3 | 0.3304 | 6 | 0.0340 | 8.2 | heavy haze | None |
| Ex. 3 | M'D10M' | 100HA350 | 5 | 4 | 0.365 | 6 | 0.0418 | 8.6 | heavy haze | None |
| Comp. Ex. 1 | M'D10M' | 100HA550 | 2 | 1 | 0.164 | 87 | 0.0300 | 16.7 | medium haze | None |
| Comp. Ex. 2 | M'D10M' | 100HA550 | 5 | 1 | 0.1643 | 86 | 0.0307 | 18.8 | heavy haze | None |
| Comp. Ex. 3 | MD43D'7M | 75HA750 | 2 | 1 | 0.1637 | 84 | 0.0299 | 11.3 | clear | None |
| Comp. Ex. 4 | M"D24M" | 60H3000 | 2 | 4 | 0.3832 | 6 | 0.0473 | 9.1 | heavy haze | None |
| Comp. Ex. 5 | M'D15M' | 100HA350 | 5 | DNF | DNF | DNF | DNF | DNF | heavy haze | None |
| Comp. Ex. 6 | M'"24M" | 60H3000 | 5 | 2 | 0.2864 | 5 | 0.0370 | 8.8 | heavy haze | None |

*Cell Structure: 1 = Fine; 2 = medium; 3 = coarse; 4 = very coarse; DNF: Did not form a stable foam.

As shown in Table 2 and as expected, the polyurethane foam of Comparative Example 3 exhibited a high percentage of closed-cells (>80%) with fine cell structure and low k-factor. Also as expected, the $(AB)_n$ surfactant of Comparative Examples 4 and 6 made open-celled foams. The higher surfactant concentration used in Comparative Example 6 led to a finer cell structure and correspondingly lower k-factor while maintaining an open-cell structure. The polyurethane foams of Comparative Examples 1 and 2, made with nonhydrolyzable ABA' surfactants, were predominantly closed-cell foams. Surprisingly, the foams of Examples 1 and 2 were open-celled foams with better cell structure and lower k-factors than the foam of Comparative Example 4. The foam of Example 1 also had a finer open cell structure than that of Comparative Example 6 despite the latter's higher surfactant concentration. The failure of Comparative Example 5 to provide a stable foam suggests the influence of excessively high surfactant levels. The failure of Comparative Examples 1 and 2 to produce open-cell foams demonstrates the need for a balance between the number average molecular weights of the B block and the A and A' blocks constituting the ABA' block copolymer.

The data in Table 3 below demonstrate the influence of the number average molecular weights of the silicone B block and polyether A and A' blocks of the ABA' copolymer surfactants on the cell structures of the resulting polyurethane foams.

75HA750 with either M'D45M' (Comparative Example 11) or M'D90M' (Comparative Example 13) did not support the formation of stable foams. In these two examples, the polysiloxane B segment was too large relative to the polyether A and A' segments giving the copolymers foam destabilizing characteristics similar to a polydimethylsiloxane oil. The polyurethane foam made with the unbalanced ABA' copolymers obtained from the reaction of 75HA1500 with M'D45M' pro-

TABLE 3

Influence of Molecular Weights of Silicone and Polyether Blocks on Polyurethane Foam Properties: Out-of-Balance ABA' Copolymer Surfactants

| Example | Surfactant | | pphp Surf | Cell Structure | Average K-factor | Percent Closed-cell | K-Factor Pad Density (g/cc) | Ave Perp. Comp Strength | Resin Stability | Gel |
|---|---|---|---|---|---|---|---|---|---|---|
| | Silicone Reactant | Polyether Reactant | | | | | | | | |
| Comp. Ex. 7 | M'D10M' | 75HA750 | 2 | 1.0 | 0.1626 | 85 | 0.0282 | 13.4 | hazy | Trace |
| Comp. Ex. 8 | M'D10M' | 75HA1500 | 2 | 1.0 | 0.1642 | 88 | 0.0285 | 16.3 | clear, stable bubbles | None |
| Comp. Ex. 9 | MD43D'7M | 75HA750 | 2 | 1.0 | 0.1629 | 82 | 0.0287 | 10.1 | clear | None |
| Comp. Ex. 10 | M"D24M" | 60H3000 | 5 | 1.5 | 0.1759 | 57 | 0.0288 | 8.3 | hazy | None |
| Comp. Ex. 11 | M'D45M' | 75HA750 | 2 | DNF | DNF | DNF | DNF | DNF | hazy | Trace |
| Comp. Ex. 12 | M'D45M' | 75HA1500 | 2 | 1.5 | 0.1736 | 81 | 0.0289 | 14.8 | blue-white haze | None |
| Comp. Ex. 13 | M'D90M' | 75HA750 | 2 | DNF | DNF | DNF | DNF | DNF | hazy | Gel |
| Comp. Ex. 14 | M'D90M' | 75HA1500 | 2 | 4.0 | 0.3364 | did not analyze | | | hazy | Trace |

As shown in Table 3, the foams made with out-of-balance (i.e., unbalanced or non-balanced) ABA' copolymers derived from silicone M'D10M' (Comparative Examples 7 and 8) were closed-cell foams similar to that of the foam of Comparative Example 9. The high molecular weights of the polyether blocks relative to the low molecular weight of the silicone block in the copolymers used in Comparative Examples 7 and 8 resulted in the production of foams having high closed-cell contents. The polyurethane foams made with unbalanced ABA' copolymers obtained from the reaction of duced a fine, closed cell foam (Comparative Example 12) while the foam made with the ABA' copolymer made from the reaction of 75HA1500 with M'D90M' (Comparative Example 14) exhibited a very coarse cell structure. The polyurethane foam of Comparative Example 10 was predominantly closed cell.

Several polyether-polysiloxane surfactants made with M'D20M' to provide the B segment of the surfactants were evaluated with the results set forth in Table 4 as follows:

TABLE 4

Performance of ABA' Block Copolymer Surfactants

| Example | Surfactant | | pphp Surf | Cell Structure | Average K-factor | Percent Closed-cell | K-Factor Pad Density (g/cc) | Ave Perp. Comp. Strength | Resin Stability | Gel |
|---|---|---|---|---|---|---|---|---|---|---|
| | Silicone Reactant | Polyether Reactant | | | | | | | | |
| Ex. 4 | M'D20M' | 100HA750 | 5 | 2.0 | 0.2336 | 11 | 0.0309 | 11.4 | milky white, heavy haze | None |
| Ex. 5 | M'D20M' | 75HA750 | 5 | 2.5 | 0.2437 | 6 | 0.0373 | 10.0 | hazy, almost translucent | None |
| Ex. 6 | M'D20M' | 75HA1500 | 5 | 3.0 | 0.2711 | 8 | 0.0298 | 9.8 | heavy haze | None |
| Comp. Ex. 15 | M"D24M" | 60H3000 | 5 | 1.5 | 0.1661 | 68 | 0.0293 | 9.2 | yellowish, heavy haze | None |
| Comp. Ex. 16 | M'D20M' | 100HA350 | 5 | DNF | DNF | DNF | DNF | DNF | white/yellow, heavy haze | None |
| Comp. Ex. 17 | M'D20M' | 100HA550 | 5 | DNF | DNF | DNF | DNF | DNF | yellowish, heavy haze | None |
| Comp. Ex. 18 | M'D20M' | 100HA550 | 5 | DNF | DNF | DNF | DNF | DNF | white/yellow, heavy haze | None |

As the data in Table 4 show, the (AB)$_n$ surfactant of Comparative Example 15 resulted in a predominantly closed-cell polyurethane foam with fine cell structure while the balanced ABA' surfactants of Examples 4, 5 and 6 unexpectedly resulted in predominantly open-celled polyurethane foams with acceptable cell structures. The unbalanced ABA' surfactants of Comparative Examples 16, 17 and 18 resulted in unstable polyurethane foams, thought to be due to the relatively high ratio in these surfactants of the number average molecular weight of the polysiloxane chain to the number average molecular weights of the polyether chains.

Table 5 below sets forth the results obtained using ABA' block copolymer surfactants made with different silicone reactants but with the same polyether reactant, 50HA750, which is made with approximately equal weight percents of ethylene oxide and propylene oxide.

TABLE 5

Performance of ABA' Block Copolymer Surfactants Made With Polyether 50 Weight Percent Copolymerized Ethylene Oxide

| Example | Surfactant | | pphp Surf | Cell Structure | Average K-factor | Percent Closed-cell | Pad Density (g/cc) | K-Factor Comp. Strength | Ave Perp. Resin Stability (3 day) | Gel (3 day) |
|---|---|---|---|---|---|---|---|---|---|---|
| | Silicone Reactant | Polyether Reactant | | | | | | | | |
| Ex. 7 | M'D10M' | 50HA750 | 5 | 3.0 | 0.2920 | 7 | 0.0354 | 2.5 | Yellow-white haze | No Gel |
| Comp. Ex. 19 | M'D5M' | 50HA750 | 5 | 1.0 | 0.1644 | 89 | 0.0299 | 22.6 | Yellow-white haze | No Gel |
| Comp. Ex. 20 | M'D15M' | 50HA750 | 5 | 4.0 | 0.3424 | did not run | 0.0397 | did not run | Yellow-white haze | No Gel |
| Comp. Ex. 21 | M'D20M' | 50HA750 | 5 | DNF | DNF | DNF | DNF | DNF | Yellow-white haze | No Gel |
| Comp. Ex. 22 | M'D24M' | 50HA750 | 5 | DNF | DNF | DNF | DNF | DNF | Yellow-white haze | No Gel |

The data in Table 5 show that only the polyurethane foam of Example 7 exhibited an acceptable open-cell structure. Thus, for the rigid polyurethane foam-forming formulation of Table 1, supra, the ABA' block copolymer obtained from silicone M'D10M' and polyether 50HA750 was the only polysiloxane-polyether surfactant in Table 5 to be a balanced ABA' block copolymer surfactant.

A number of rigid polyurethane foams were prepared to determine whether ABA' block copolymer surfactants made by reacting silicone M'D20M' with a 75HA or 100HA polyether would open overpacked ("OP") polyurethane foams, i.e., foams produced by charging a mold with more than the minimum amount of foam-forming reaction medium required to fill the mold. This is a common industrial practice as it assures that the mold will fill completely with foam product every time. Overpacking typically results in a denser, stronger foam whose cells are more resistant to opening during the foaming operation. Table 6 below demonstrates the influence of copolymer structure on the properties of rigid polyurethane foams made at 5 and 10 percent OP levels.

TABLE 6

Performance of Polyether-polysiloxane Block Copolymer Surfactants Under Overpacked Conditions

| Example | % OP Condition | Surfactant | | pphp Surf | Cell Structure | Average K-Factor | Percent Closed-cells | Pad Density (g/cc) | K-Factor Comp. Strength | Ave. Perp. Shrinkage |
|---|---|---|---|---|---|---|---|---|---|---|
| | | Silicone Reactant | Polyether Reactant | | | | | | | |
| Ex. 8 | 5% | M'D20M' | 100HA750 | 5 | 2.0 | 0.2376 | 9 | 0.032 | 12.4 | None |
| Ex. 9 | 5% | M'D20M' | 75HA750 | 5 | 2.5 | 0.2482 | 6 | 0.038 | 10.6 | None |
| Ex. 10 | 5% | M'D20M' | 75HA1500 | 5 | 3.0 | 0.2778 | 10 | 0.030 | 9.6 | None |
| Ex. 11 | 10% | M'D20M' | 100HA750 | 5 | 1.5 | 0.2139 | 14 | 0.033 | 20.1 | None |
| Ex. 12 | 10% | M'D20M' | 75HA750 | 5 | 2.0 | 0.2286 | 8 | 0.039 | 23.2 | None |
| Comp. Ex. 23 | 10% | M'D20M' | 75HA1500 | 5 | 2.5 | 0.2135 | 62 | 0.035 | 18.7 | None |
| Comp. Ex. 24 | 5% | M"D24M" | 60H3000 | 5 | 2.5 | 0.2779 | 5 | 0.040 | 12.9 | None |
| Comp. Ex. 25 | 10% | M"D24M" | 60H3000 | 5 | 2.0 | 0.2600 | 6 | 0.043 | 24.8 | None |

As the data in Table 6 show, the balanced ABA' block copolymer surfactants made with polyethers 100HA750 (Examples 8 and 11) and 75HA750 (Examples 9 and 12) provided open-celled rigid polyurethane foams with cell structures at least as fine as those of polyurethane foams made with the (AB)$_n$-type block copolymer surfactant (control) used in Comparative Examples 24 and 25. Example 10 using an ABA' block copolymer surfactant made with 75HA1500 as the polyether also provided a stable open-cell polyurethane foam at an OP level of 5 percent. However, as seen in Comparative Example 23, this same copolymer was not sufficiently balanced to open at least 50 percent of the cells at an OP level of 10 percent.

Data presented in Table 7 below demonstrate the effect of end-capping the terminal hydroxyl group of the same ABA' block copolymer surfactants identified in Table 6 with methoxy and acetoxy groups.

mately 23° C.). The pre-blended polyol was stirred at 3500 rpm with a 2 inch double disc Conn blade for 5 seconds to aid nucleation. The polyisocyanate was then added to the pre-blended polyol with mixing at 3500 rpm using the same blade for 5 seconds. The uniformly blended polyurethane foam-forming reaction mixture was then poured into a 2-liter paper container and allowed to rise. The initial maximum rise height and foam height after 24 hours were recorded. The foams were then cut into test sections and analyzed for closed-cell content, density, cell structure and shrinkage.

The components of Microcellular Foam Formulations A and B and their amounts are set forth in Tables 8 and 9. The influence of the ABA' block copolymers on the structure-performance properties of the resulting foams is indicated by the data presented in Tables 10 to 13 below.

TABLE 7

Effect of End-capping on Performance of Balanced ABA' Block Copolymers

| Example | Surfactant Silicone Reactant | Surfactant Polyether Reactant | pphp Surf | Cell Structure | Total Density (g/liter) | K-Factor Pad Density (g/liter) | K-factor (Btu in./ft2 hF) | Percent Closed-cell Content |
|---|---|---|---|---|---|---|---|---|
| Ex. 13 | M'D20M' | 100HA750 | 5 | 1 | 38.1 | 31.2 | 0.1937 | 9.81 |
| Ex. 14 | M'D20M' | 100HA750-OMe | 5 | 2 | 38.1 | 30.2 | 0.1785 | 43.90 |
| Ex. 15 | M'D20M' | 75HA750 | 5 | 2 | 38.1 | 32.4 | 0.2314 | 8.56 |
| Ex. 16 | M'D20M' | 75HA750-OMe | 5 | 4 | 43.9 | 37.8 | 0.2944 | 6.57 |
| Ex. 17 | M'D20M' | 75HA750-OAc | 5 | 4 | 44.1 | 39.3 | 0.2916 | 7.25 |
| Comp. Ex. 26 | M'D20M' | 100HA750-OAc | 5 | 1 | 38.3 | 32.3 | 0.1668 | 74.80 |
| Comp. Ex. 27 | M'D20M' | 75HA1500 | 5 | 1 | 36.0 | 30.8 | 0.1684 | 86.45 |
| Comp. Ex. 28 | M'D20M' | 75HA1500-OMe | 5 | 1 | 36.3 | 30.9 | 0.1646 | 84.35 |
| Comp. Ex. 29 | M'D20M' | 75HA1500-OAc | 5 | 1 | 36.3 | 31.1 | 0.1619 | 83.18 |
| Comp. Ex. 30 | MD43D'7M | 75HA750 | 2 | 1 | 36.3 | 30.3 | 0.164 | 79.30 |
| Comp. Ex. 31 | M"D24M" | 60H3000 | 5 | 3 | 41.3 | 37.7 | 0.2595 | 10.20 |

As the data in Table 7 show and as expected, the polyurethane foam of Comparative Example 30 was predominantly closed-cell with a fine cell structure while the polyurethane foam of Comparative Example 31 was open-cell with a coarse cell structure. End-capping the balanced ABA' block copolymer made with polyether 100HA750 (Example 14 and Comparative Example 26) resulted in increasing the closed-cell content of the resulting rigid foam relative to the foam prepared with the uncapped analogue of Example 13. End-capping the ABA' block copolymers made with polyether 75HA750 (Examples 16 and 17) resulted in the production of coarser open-cell foams relative to the foam prepared with the uncapped analogue of Example 15. The ABA' block copolymers made with polyether 75HA1500 (Comparative Examples 27-29) resulted in predominantly closed-cell foams regardless of whether or not the terminal polyether hydroxyl was capped.

Examples 18-33; Comparative Examples 32-45

The performance of various ABA' block copolymer surfactants was evaluated in each of two flexible microcellular polyurethane free-rise foam-forming formulations designated Microcellular Foam Formulations A and B. The pre-blended polyol (mixture of polyols, water, catalysts and surfactant) and the polyisocyanate components of the formulations were brought to room temperature (approxi-

TABLE 8

Microcellular Foam Formulation A

| Component | Description | Pphp | weight % |
|---|---|---|---|
| Arcol ® 11-34 polyol | polyether polyol triol, $M_n$ of 4800 | 100 | 91.22 |
| Water | | 1 | 0.91 |
| EG | ethylene glycol | 6 | 5.47 |
| Surfactant | see Tables 10 and 11, infra | 2 | 1.82 |
| Niax ® Catalyst A-510 | tertiary amine blow catalyst | 0.2 | 0.18 |
| Niax ® Catalyst A-530 | tertiary amine gel catalyst | 0.4 | 0.37 |
| Foamrez ® UL-29 | tin catalyst | 0.03 | 0.03 |
| Isonate ® 143L | polycarbodiimide-modified MDI (NCO content is 29.2% by wt) | 49.56 g iso/ 100 g resin | |
| Index = 102 | | | |

Arcol is a registered trademark of Bayer MaterialScience;
Niax is a registered trademark of Momentive Performance Materials;
Foamrez is a registered trademark of Crompton Corporation;
Isonate is a registered trademark of the Dow Chemical Corporation.

TABLE 9

Microcellular Foam Formulation B

| Component | Description | Pphp | weight % |
|---|---|---|---|
| Arcol ® 11-34 polyol | polyether polyol triol, $M_n$ of 4800 | 100 | 91.14 |

TABLE 9-continued

Microcellular Foam Formulation B

| Component | Description | Pphp | weight % |
|---|---|---|---|
| Water | | 1 | 0.91 |
| EG | ethylene glycol | 6 | 5.47 |
| Surfactant | see Tables 12 and 13, infra | 2 | 1.82 |
| Niax ® Catalyst A-533 | tertiary amine gel catalyst | 0.68 | 0.62 |
| Foamrez ® UL-29 | tin catalyst | 0.045 | 0.04 |
| Isonate ® 143L | polycarbodiimide-modified MDI (NCO content is 29.2% by wt) | 48.81 g iso/ 100 g resin | |
| Index = 102 | | | |

The properties of the microcellular polyurethane foams resulting from Formulation A are presented in Table 10 as follows:

TABLE 10

Influence of Polyether-polysiloxane Block Copolymer Surfactants on Properties of Polyurethane Foams Obtained From Microcellular Foam Formulation A

| | Surfactant | | Initial Foam | Foam | Foam | Core | % Closed- | Cell | |
|---|---|---|---|---|---|---|---|---|---|
| Example | Silicone Reactant | Polyether Reactant | Height (mm) | Ht 24 hrs (mm) | Height Shrinkage | Density (g/cc) | cell Content | Structure | Shrinkage |
| Ex. 18 | M'D20M' | 100HA750 | 208 | 193 | 7.2 | 0.107 | 30 | 1.5 | None |
| Ex. 19 | M'D20M' | 75HA750 | 173 | 170 | 1.6 | 0.131 | 11.4 | 2.5 | None |
| Ex. 20 | M'D20M' | 75HA1500 | 202 | 193 | 4.4 | 0.102 | 13.9 | 1.5 | None |
| Comp. Ex. 32 | MD43D'7M | 75HA750 | 202 | 147 | 27.1 | 0.218 | 32.9 | 1.5 | Severe |
| Comp. Ex. 33 | M"D24M" | 60H3000 | 178 | 175 | 1.5 | 0.133 | 10.3 | 2 | None |
| Comp. Ex. 34 | MD65D'8M | 40HA2300 | 201 | 191 | 5.2 | 0.115 | 25.3 | 1.5 | None |

The polyurethane foams of Comparative Examples 32 and 34, both made with conventional comb-type block copolymer surfactants, had relatively high closed-cell contents (for microcellular foam formulations, closed cell contents of more than 30% cause dimensional stability problems) with the foam of Comparative Example 32 exhibiting the highest closed cell content and undergoing severe shrinkage within a few hours. No shrinkage was evident with any of the microcellular polyurethane foams made with the balanced ABA' polyether-polysiloxane block copolymer surfactants herein (Examples 18-20). The cell structures of the polyurethane foams made with surfactants derived from polyethers 100HA750 and 75HA1500 (Examples 18 and 20) were at least as fine as the polyurethane foams of Comparative Examples 32 and 34. The balanced ABA' block copolymers of Examples 18 and 20 unexpectedly resulted in dimensionally stable foams with large initial foam rise heights similar to those achieved with the comb copolymers of Comparative Examples 32 and 34. As expected, the polyurethane foam prepared with the $(AB)_n$ surfactant of Comparative Example 33 was predominantly open-celled but with a relatively low initial foam height.

Table 11 below shows the effect of end-capping the terminal hydroxyl groups of the same types of ABA' block copolymers that were evaluated in Table 10, supra.

TABLE 11

Effect of Using End-capped Polyether Reactants for the Preparation of the Block Copolymer Surfactants Used in Microcellular Foam Formulation A

| | Surfactant | | Initial Foam | 24 Hr. | | Core | Percent Closed- | Cell | |
|---|---|---|---|---|---|---|---|---|---|
| Example | Silicone Reactant | Polyether Reactant | Height (mm) | Height (mm) | 24 Hr % Shrinkage | Density (g/cc) | cell Content | Structure | Shrinkage |
| Ex. 21 | M'D20M' | 100HA750 | 101 | 94 | 6.9 | 0.11 | 16 | 1.5 | None |
| Ex. 22 | M'D20M' | 75HA750 | 83 | 79 | 4.3 | 0.13 | 13 | 2 | None |
| Ex. 23 | M'D20M' | 75HA1500 | 99 | 97 | 2.3 | 0.11 | 16 | 1 | None |
| Ex. 24 | M'D20M' | 100HA750-OMe | 87 | 81 | 5.3 | 0.13 | 13 | 2 | None |
| Ex. 25 | M'D20M' | 75HA750-OMe | 97 | 94 | 3 | 0.11 | 12 | 1.5 | None |
| Ex. 26 | M'D20M' | 75HA1500-OMe | 98 | 94 | 3.6 | 0.11 | 17 | 1 | None |
| Ex. 27 | M'D20M' | 100HA750-OAc | 85 | 84 | 1.3 | 0.14 | 13 | 2 | None |
| Ex. 28 | M'D20M' | 75HA750-OAc | 97 | 94 | 3.3 | 0.11 | 16 | 1.5 | None |
| Ex. 29 | M'D20M' | 75HA1500-OAc | 97 | 94 | 3.3 | 0.12 | 13 | 1 | None |
| Comp. Ex. 35 | MD43D'7M | 75HA750 | 102 | 51 | 50.8 | 0.25 | 47 | 1 | Severe |
| Comp. Ex. 36 | M"D24M" | 60H3000 | 87 | 81 | 5.3 | 0.15 | 14 | 1 | None |

From the data set forth in Table 11, it is seen that the microcellular polyurethane foam made with $(AB)_n$-type surfactant (Comparative Example 36) was open-celled and did not show any shrinkage while the foam made with the comb-type copolymer (Comparative Example 35) had a high closed-cell content that underwent severe shrinkage. All of the balanced ABA' block copolymers of the invention (Examples 21-29) whether hydroxyl-terminated or end-capped with acetoxy or methoxy groups provided dimensionally stable foams with open-cells and fine-to-medium cell structures.

A series of microcellular polyurethane foams was made with Microcellular Foam Formulation B to determine the influence of several different polyether-polysiloxane block copolymer surfactants on the physical properties of the foams. Formulation B has a significantly greater tendency to make closed-cell foams than Formulation A. The physical properties of the foams are presented in Table 12 as follows:

cell structure, a lower foam height and a higher density than the foams of Examples 30-32 which were made with balanced ABA' copolymer surfactants.

Several microcellular polyurethane foams were prepared with Microcellular Formulation B to determine if cell opening achieved with a balanced ABA' block copolymer herein (Example 33) was a function of the high ethyleneoxy content of the polyether reactant and relatively low degree of branch-

TABLE 12

Influence of Polyether-polysiloxane Block Copolymer Surfactants on Properties of Polyurethane Foams Obtained From Microcellular Foam Formulation B

| Example | Surfactant | | Initial Height (in) | 24 Hr Height (in) | Core 24 Hr % Shrinkage | Percent Density (g/cc) | Closed-cell | Cell Structure | Shrinkage |
|---|---|---|---|---|---|---|---|---|---|
| | Silicone Reactant | Polyether Reactant | | | | | | | |
| Ex. 30 | M'D20M' | 100HA750 | 3.84 | 3.49 | 9.2 | 0.11 | 14.2 | 1 | None |
| Ex. 31 | M'D20M' | 75HA750 | 3.4 | 3.21 | 5.7 | 0.14 | 12 | 2* | None |
| Ex. 32 | M'D20M' | 75HA1500 | 3.92 | 3.73 | 4.8 | 0.11 | 13.4 | 1 | None |
| Comp. Ex. 37 | M"D24M" | 60H3000 | 3.04 | 2.93 | 3.8 | 0.15 | 12.7 | 1.5 | None |
| Comp. Ex. 38 | MD65D'8M | 40HA2300 | 3.72 | 2.96 | 20.5 | 0.24 | 38.8 | 1 | Severe |
| Comp. Ex. 39 | MD29D'9M | 75HA750 | 3.82 | 2.4 | 37.1 | 0.29 | 50.5 | 1 | Severe |

*Row of large cells and voids present at cup bottom.

As the data in Table 12 show and as expected, the foams of Comparative Examples 38 and 39, both of which were made with conventional comb-type block copolymer surfactants, had relatively high closed-cell contents and underwent severe shrinkage within a few hours of curing in contrast to the foams obtained with the balanced ABA' copolymers of this invention (Examples 30-32) which resulted in stable, open-cell polyurethane foams. It was also surprising to observe that the balanced ABA' block copolymer surfactants made by reacting silicone M'D20M' with either polyether 100HA750 or 75HA1500 (Examples 30 and 32, respectively) provided dimensionally stable foams with fine cell structure and large rise heights similar to those achieved with the conventional comb-type copolymer surfactants of Comparative Examples 38 and 39. As expected, the foam of Comparative Example 37 was dimensionally stable with open cells but had a coarser ing or was due to the ABA' structure. The surfactants of Comparative Examples 43-45 are conventional comb-type copolymers with 2.5 to 3.2 branches per siloxane chain (which is close to the two terminal polyether blocks (branches) in the balanced ABA'-type block copolymer of the invention). The polyether reactants contained from 75 to 100 percent polymerized ethylene oxide. The properties of the polyurethane foams obtained with these surfactants are presented in Table 13 as follows:

TABLE 13

Effect of Polymerized Ethylene Oxide Content of ABA' Copolymers on Properties of Polyurethane Foams Prepared From Microcellular Foam Formulation B

| Example | Surfactant | | Initial Height (in) | 24 Hr Height (in) | Core 24 hr % Shrinkage | Percent Density (g/cc) | Closed-cell | Cell Structure | Shrinkage |
|---|---|---|---|---|---|---|---|---|---|
| | Silicone Reactant | Polyether Reactant | | | | | | | |
| Ex. 33 | M'D20M' | 100HA750 | 4.85 | 4.69 | 3.4 | 0.11 | 12.1 | 1 | None |
| Comp. Ex. 40 | M"D24M" | 60H3000 | 3.76 | 3.59 | 4.7 | 0.15 | 11.9 | 1.5 | None |
| Comp. Ex. 41 | MD65D'8M | 40HA2300 | 4.94 | 2.95 | 67.5 | 0.19 | 31.4 | 1.5 | Severe |
| Comp. Ex. 42 | MD29D'9M | 75HA750 | 4.93 | 3.11 | 58.5 | 0.13 | 21.8 | 1 | Severe |
| Comp. Ex. 43 | MD20D'3.2M | 75HA750 | 5.02 | 3.1 | 61.9 | 0.23 | 40 | 1 | Severe |
| Comp. Ex. 44 | MD20D'3.2M | 100HA550 | 4.94 | 3.29 | 50.2 | 0.2 | 30.1 | 1 | Severe |
| Comp. Ex. 45 | MD22.5D'2.5M | 100HA750 | 5.07 | 3.41 | 48.7 | 0.18 | 28.2 | 1 | Severe |

*Row of large cells and voids present at cup bottom.

As indicated in the data presented in Table 13, all of the comb copolymers produced dimensionally unstable polyurethane foams which underwent severe shrinkage and possessed relatively high closed-cell contents (Comparative Examples 41-45). In contrast, the polyurethane foam of Example 33 was a structurally stable, open-cell foam with low density and fine cell structure. Comparative Example 40 illustrating the use of an (AB)$_n$ copolymer surfactant produced a dimensionally stable predominantly open-cell polyurethane foam exhibiting good cell structure.

Examples 34-38; Comparative Examples 46-49

A series of polyurethane foams was made with Flexible Foam Formulation A as set forth in Table 14 and with the surfactants described in Table 15. The physical properties of the resulting foams are presented in Table 15.

As the data in Table 15 show, use of the balanced ABA' polyether-polysiloxane block copolymer surfactants in Examples 34-36 resulted in stable, open-cell (low foam tightness) polyurethane foams with fine cell structure and good dimensional stability. Comparative Example 46 shows that in the absence of a surfactant, the resulting foam was unstable and collapsed. When a conventional polyether-polysiloxane comb copolymer is used (Comparative Example 47), the result was a stable, closed-cell (high foam tightness) polyurethane foam with good cell structure but poor dimensional stability.

A second series of foams was made with Flexible Foam Formulation B as set forth in Table 16 and with the surfactants described in Table 17.

TABLE 14

Flexible Foam Formulation A

| Component | Description | Pphp |
|---|---|---|
| Polyol A | polyether triol, 75% EO, 25% PO, $M_n$ = 6000, 28 hydroxyl number | 80.0 |
| Polyol B | polyether triol, 20% EO, 80% PO, $M_n$ = 6000, 28 hydroxyl number | 10.0 |
| Polyol C | polyether polyol, functionality = 4.2, 480 hydroxy number | 10.0 |
| Water | Water | 3.6 |
| Niax ® Catalyst A-400 | tertiary amine catalyst | 0.2 |
| Niax ® Catalyst A-300 | tertiary amine catalyst | 0.4 |
| Surfactant | see Table 15, infra | 0.3 |
| Total | | 104.5 |
| Suprasec ® 2424 | MDI composition, NCO content = 26.4% | index = 100 |

*Suprasec ® is a trademark of Huntsman International LLC.

TABLE 16

Flexible Foam Formulation B

| Component | Description | pphp |
|---|---|---|
| Polyol A | polyether triol, 75% EO, 25% PO, $M_n$ = 6000, 28 hydroxyl number | 10.0 |
| Polyol B | polyether triol, 20% EO, 80% PO, $M_n$ = 6000, 28 hydroxyl number | 90.0 |
| Water | Water | 3.0 |
| Niax ® Catalyst EF-700 | tertiary amine catalyst | 1.0 |
| Surfactant | see Table 17, infra | 0.0-0.8 |
| Total | | 104.0-104.8 |
| Suprasec ® 2424 | MDI composition, NCO content = 26.4% | index = 100 |

TABLE 15

Properties of Polyurethane Foams Made with Flexible Foam Formulation A and Various Surfactants

| Example | Surfactant Silicone Reactant | Surfactant Polyether Reactant | pphp Surfactant | Foam Stability | Cell Structure | Foam Tightness* | Shrinkage |
|---|---|---|---|---|---|---|---|
| Ex. 34 | M'D4M' | 100HA550 | 0.3 | good | fine | 1 | No |
| Ex. 35 | M'D7M' | 100HA350 | 0.3 | good | medium | 1 | No |
| Ex. 36 | M'D7M' | 75HA750 | 0.3 | good | very fine | 2 | No |
| Comp. Ex. 46 (no surfactant) | | | none | collapse | not applicable | not applicable | not applicable |
| Comp. Ex. 47 | MD43D'7M | 75HA750 | 1.0 | good | fine | 5 | yes |

*1 = open-celled foam; 5 = tight (closed cell) foam.

TABLE 17

Properties of Polyurethane Foams Made with Flexible Foam Formulation B and Various Surfactants

| | Surfactant | | | | | | | |
| --- | --- | --- | --- | --- | --- | --- | --- | --- |
| Example | Silicone Reactant | Polyether Reactant | pphp Copolymer | Foam Stability | Cell Structure* | Foam Tightness** | Shrinkage | Crushable |
| Ex. 37 | M'D4M' | 100HA350 | 0.3 | good | fine | 1 | no | yes |
| Ex. 38 | M'D8M' | 100HA550 | 0.4 | good | coarse | 3 | slight | yes |
| Comp. Ex. 48 (no surfactant) | | | none | collapse | not applicable | not applicable | not applicable | not applicable |
| Comp. Ex. 49 | MD43D'7M | 75HA750 | 0.8 | good | very fine | 5 | yes | no |

As the data in Table 17 show and as expected, the foam of Comparative Example 48 which was made without any surfactant collapsed. The foam of Comparative Example 49, made with a conventional polydimethylsiloxane-polyether comb copolymer, produced a fine, closed cell foam that underwent significant shrinkage. Example 37, made with a balanced ABA' polyether-polysiloxane block copolymer surfactant in accordance with the invention, produced a stable, fine open-cell polyurethane foam with no shrinkage. Example 38, while it produced a polyurethane foam with coarser cells than that of Example 37 and underwent slight shrinkage, was still significantly better than the foam of Comparative Example 49.

Other embodiments of the invention will be apparent to those skilled in the art from a consideration of this specification or practice of the invention disclosed herein. It is intended that the specification and examples be considered as exemplary only, with the true scope and spirit of the invention being defined by the following claims.

The invention claimed is:

1. A predominantly open-cell rigid, stable polyurethane foam obtained from a predominantly open-cell rigid polyurethane foam-forming reaction medium which comprises:
   a) at least one polyol;
   b) at least one polyisocyanate;
   c) at least one catalyst;
   d) water;
   e) a predominantly open-cell rigid, stable polyurethane foam-forming amount of at least one surfactant which is a balanced, substantially linear polyether-polysiloxane ABA' block copolymer represented by the general formula:

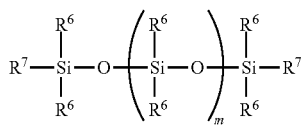

wherein:
   each $R^6$ independently is alkyl or aryl of up to 18 carbon atoms; and,
   each $R^7$ independently is a non-hydrolyzable, hydroxyl-terminated polyether moiety of either random or blocked structure —$CHR^1CHR^2CR^3R^4$—$(R^5)_p$O—$(C_2H_4O)_x(C_yR^8{}_{2y}O)_z$H in which $R^1$, $R^2$, $R^3$ and $R^4$ each independently is hydrogen or a monovalent hydrocarbon group of up to 8 carbon atoms which is free of aliphatic carbon-to-carbon multiple bonds, $R^5$ is a divalent hydrocarbon group of up to 12 carbon atoms which is free of aliphatic carbon-to-carbon multiple bonds and p has a value of 0 or 1, each $R^8$ independently is hydrogen, alkyl of up to 18 carbon atoms, phenyl or alkyl-substituted phenyl in which the alkyl substituent(s) independently contain up to 4 carbon atoms, x is from 5 to 50, y is from 2 to 6, z is from 0 to 25, and x+z is from 5 to 50, and,
   m is from 10 to 40; and,
   f) optionally, at least one additional component selected from the group consisting of other polymer and/or copolymer, chain extender, crosslinker, non-aqueous blowing agent, filler, reinforcement, pigment, tint, dye, colorant, flame retardant, antioxidant, antiozonant, UV stabilizer, anti-static agent, biocide and biostat.

2. The predominantly open-cell rigid, stable polyurethane foam of claim 1 wherein:
   each $R^6$ independently is alkyl of up to 3 carbon atoms; and,
   independently in each polyether moiety $R^7$,
   $R^1$ is hydrogen;
   $R^2$ is hydrogen or alkyl of up to 3 carbon atoms;
   $R^3$ is hydrogen or alkyl of up to 3 carbon atoms;
   $R^4$ is hydrogen or alkyl of up to 3 carbon atoms;
   each $R^8$ independently is hydrogen or alkyl of up to 3 carbon atoms;
   p is 0;
   x is from 6 to 40;
   y is from 2 to 4;
   z is from 0 to 20;
   x+z is from 6 to 40;
   x/(x+z) is at least 0.57; and,
   m is from 10 to 30.

3. The predominantly open-cell rigid polyurethane foam of claim 1 wherein:
   each $R^6$ is methyl; and,
   independently in each polyether moiety $R^7$,
   $R^1$ is hydrogen;
   $R^2$ is hydrogen or methyl;
   $R^3$ is hydrogen;
   $R^4$ is hydrogen;
   each $R^8$ independently is hydrogen or methyl;
   p is 0;
   x is from 6 to 30;
   y is 2;
   z is from 0 to 15;
   x+z is from 6 to 35;
   x/(x+z) is greater than 0.7; and,
   m is from 10 to 30.

4. The predominantly open-cell rigid, stable polyurethane foam of claim 1 wherein balanced, substantially linear ABA' block copolymer surfactant (e) includes a spacer group between the A and B blocks and/or the B and A' blocks.

5. The predominantly open-cell rigid, stable polyurethane foam of claim 1 wherein in balanced, substantially linear ABA' block copolymer surfactant (e), polyether blocks A and A' are derived entirely from ethylene oxide.

6. The predominantly open-cell rigid, stable polyurethane foam of claim 1 wherein in balanced, substantially linear ABA' block copolymer surfactant (e), polyether blocks A and A' are derived for at least half the weight thereof from ethylene oxide, the remaining portions of the alkyleneoxy chains constituting polyether blocks A and A' being independently derived from one or more other alkylene oxides and/or strained oxygen-containing rings.

7. The predominantly open-cell rigid, stable polyurethane foam of claim 6 wherein blocks A and A' are derived for at least 70 percent of the weight thereof from ethylene oxide.

8. The predominantly open-cell rigid, stable polyurethane foam of claim 6 wherein the remaining portions of the alkyleneoxy chains constituting polyether blocks A and A' are derived from propylene oxide.

9. The predominantly open-cell rigid, stable polyurethane foam of claim 7 wherein the remaining portions of the alkyleneoxy chains constituting polyether blocks A and A' are derived from propylene oxide.

10. A process for manufacturing a predominantly open-cell rigid polyurethane foam from a predominantly rigid, stable open-cell polyurethane foam-forming reaction medium containing at least one polyol (a), at least one polyisocyanate (b), at least one catalyst (c), water (d), at least one polyether-polysiloxane surfactant (e) represented by the general formula:

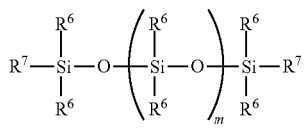

wherein:
each $R^6$ independently is alkyl or aryl of up to 18 carbon atoms; and,
each $R^7$ independently is a non-hydrolyzable, hydroxyl-terminated polyether moiety of either random or blocked structure —$CHR^1CHR^2CR^3R^4$—$(R^5)_p$O—$(C_2H_4O)_x(C_yR^8_{2y}O)_z$H in which $R^1$, $R^2$, $R^3$, and $R^4$ each independently is hydrogen or a monovalent hydrocarbon group of up to 8 carbon atoms which is free of aliphatic carbon-to-carbon multiple bonds, $R^5$ is a divalent hydrocarbon group of up to 12 carbon atoms which is free of aliphatic carbon-to-carbon multiple bonds and p has a value of 0 or 1, each $R^8$ independently is hydrogen, alkyl of up to 18 carbon atoms, phenyl or alkyl-substituted phenyl in which the alkyl substituent(s) independently contain up to 4 carbon atoms, x is from 5 to 50, y is from 2 to 6, z is from 0 to 25, and x+z is from 5 to 50; and, m is from 10 to 40 and, optionally, at least one additional component (f) selected from the group consisting of other polymer and/or copolymer, chain extender, crosslinker, non-aqueous blowing agent, filler, reinforcement, pigment, tint, dye, colorant, flame retardant, antioxidant, antiozonant, UV stabilizer, anti-static agent, biocide and biostat.

11. The process of claim 10 wherein:
each $R^6$ independently is alkyl of up to 3 carbon atoms; and,
independently in each polyether moiety $R^7$,
$R^1$ is hydrogen;
$R^2$ is hydrogen or alkyl of up to 3 carbon atoms;
$R^3$ is hydrogen or alkyl of up to 3 carbon atoms;
$R^4$ is hydrogen or alkyl of up to 3 carbon atoms;
each $R^8$ independently is hydrogen or alkyl of up to 3 carbon atoms;
p is 0;
x is from 6 to 40;
y is from 2 to 4;
z is from 0 to 20;
x+z is from 6 to 40;
x/(x+z) is at least 0.57; and,
m is from 10 to 30.

12. The process of claim 10 wherein:
each $R^6$ is methyl; and,
independently in each polyether moiety $R^7$,
$R^1$ is hydrogen;
$R^2$ is hydrogen or methyl;
$R^3$ is hydrogen;
$R^4$ is hydrogen;
each $R^8$ independently is hydrogen or methyl;
p is 0;
x is from 6 to 30;
y is 2;
z is from 0 to 15;
x+z is from 6 to 35;
x/(x+z) is greater than 0.7; and,
m is from 10 to 30.

13. The process of claim 10 wherein balanced substantially linear ABA' block copolymer surfactant (e) includes a spacer group between the A and B blocks and/or the B and A' blocks.

14. The process of claim 10 wherein in balanced substantially linear ABA' block copolymer surfactant (e), polyether blocks A and A' are derived entirely from ethylene oxide.

15. The process of claim 10 wherein in balanced substantially linear ABA' block copolymer surfactant (e), polyether blocks A and A' are derived for at least half the weight thereof from ethylene oxide, the remaining portions of the alkyleneoxy chains constituting polyether blocks A and A' being independently derived from one or more other alkylene oxides and/or strained oxygen-containing rings.

16. The process of claim 15 wherein blocks A and A' are derived for at least 70 percent of the weight thereof from ethylene oxide.

17. The process of claim 15 wherein the remaining portions of the alkyleneoxy chains constituting polyether blocks A and A' are derived from propylene oxide.

18. The process of claim 16 wherein the remaining portions of the alkyleneoxy chains constituting polyether blocks A and A' are derived from propylene oxide.

19. The predominantly open-cell rigid, stable polyurethane foam of claim 1 wherein substantially linear ABA' block copolymer surfactant(s) (e) is present in the foam-forming reaction medium at a level of from 0.1 to 10 parts per hundred parts of polyol(s) (a).

20. The process of claim 10 wherein substantially linear ABA' block copolymer surfactant(s) (e) is present in the foam-forming reaction medium at a level of from 0.1 to 10 parts per hundred parts of polyol(s) (a).

21. The predominantly open-cell rigid, stable polyurethane foam of claim 1 wherein in ABA' block copolymer surfactant(s)(e), the B block is provided by a polysiloxane reactant which possesses an Mn value of from 350 to 3,2000 and the A and A' blocks are provided by polyether reactant(s) which possess Mn values of from 200 to 3,000.

22. The process of claim 10 wherein in ABA' block copolymer surfactant(s)(e), the B block is provided by a polysiloxane reactant which possesses an Mn value of from 350 to 3,2000 and the A and A' blocks are provided by polyether reactant(s) which possess Mn values of from 200 to 3,000.

23. The predominantly open-cell rigid, stable polyurethane foam of claim 19 wherein in ABA' block copolymer surfactant(s)(e), the B block is provided by a polysiloxane reactant which possesses an Mn value of from 350 to 3,2000 and the A and N blocks are provided by polyether reactant(s) which possess Mn values of from 200 to 3,000.

24. The process of claim 20 wherein in ABA' block copolymer surfactant(s)(e), the B block is provided by a polysiloxane reactant which possesses an Mn value of from 350 to 3,2000 and the A and A' blocks are provided by polyether reactant(s) which possess Mn values of from 200 to 3,000.

25. The predominantly open-cell rigid, stable polyurethane foam of claim 1 wherein x/(x+z) is greater than 0.7 and the cell structure ranges from fine to medium.

26. The process of claim 10 wherein x/(x+z) is greater than 0.7 and the cell structure ranges from fine to medium.

27. The predominantly open-cell rigid, stable polyurethane foam of claim 1 wherein the foam-forming reaction medium contains 0.1 to 10 parts by weight of ABA' block copolymer surfactant(s) (e) per 100 parts by weight of polyol(s) (a).

28. The process of claim 10 wherein the foam-forming reaction medium contains 0.1 to 10 parts by weight of ABA' block copolymer surfactant(s) (c) per 100 parts by weight of polyol(s) (a).

* * * * *